March 21, 1939. W. R. OYSTON 2,151,663
APPARATUS FOR STABILIZING SPRUNG BODIES
Filed March 19, 1938 2 Sheets-Sheet 1

INVENTOR
William R. Oyston
BY
Robert H. Watson
ATTORNEY

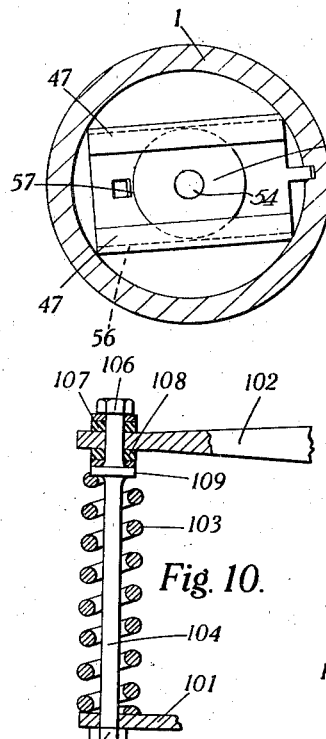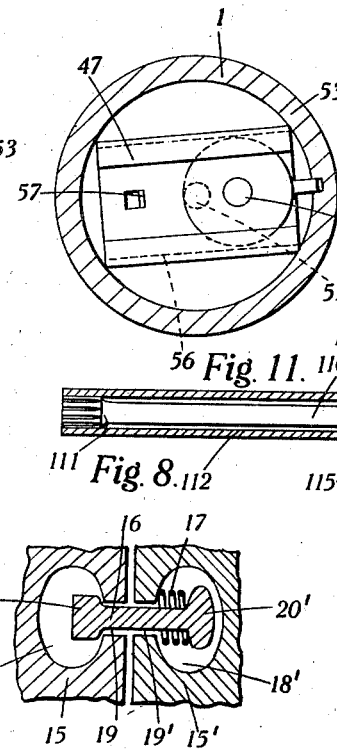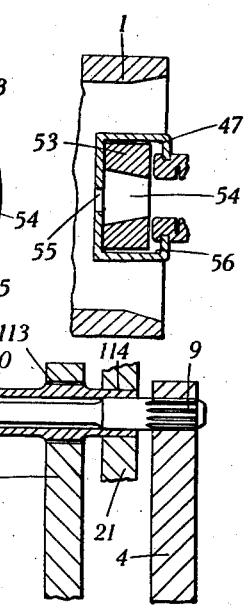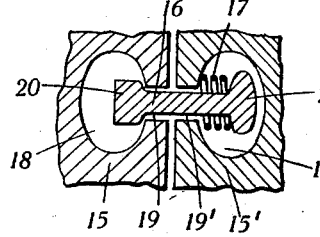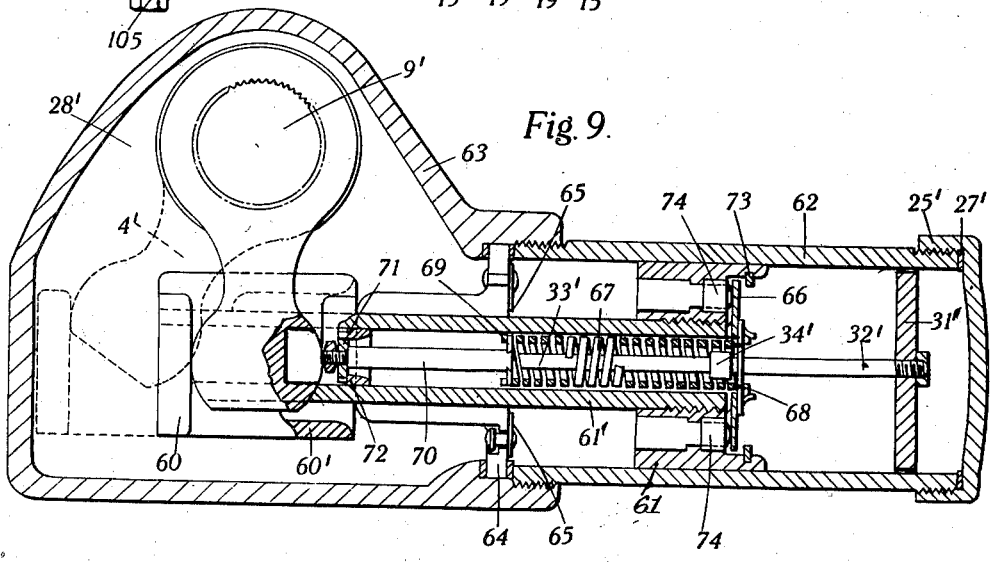

Patented Mar. 21, 1939

2,151,663

UNITED STATES PATENT OFFICE 2,151,663

APPARATUS FOR STABILIZING SPRUNG BODIES

William Robert Oyston, Westminster, London, England, assignor to Alfred Brash, Melbourne, Australia Application March 19, 1938, Serial No. 196,996
In Great Britain September 22, 1936

9 Claims. (Cl. 188—88)

The present invention relates to shock-absorbers for stabilizing a sprung body, such as the chassis of a motor vehicle.

In accordance with the present invention a shock-absorber for use between relatively movable spring-connected members (such as the frame and axle) of a vehicle, comprises means acting hydraulically to damp relative movement of said members only during predetermined phases of said movement, the incidence, direction, duration and degree of the hydraulic damping resistance being all precalculated and/or automatically dependent upon the incidence, direction, duration, speed and degree of said relative movement.

In order that the present invention may be fully understood and readily carried into effect, two embodiments of the same will now be described with reference to the accompanying drawings, in which:

Figs. 5 and 6 are end sectional views, on a larger scale, of the cornering control which constitutes a detail of Fig. 1, the sections being taken on the line 5—5 of Fig. 1, the parts of the piston upon which the cornering valve casing is mounted being omitted.

Fig. 7 is a side-sectional view of the device shown in Figs. 5 and 6.

Fig. 8 is a sectional plan view on a larger scale of a detail of the apparatus of Fig. 1.

Fig. 9 is a vertical sectional view of an alternative form of stabilizer or shock-absorber to that shown in Fig. 1 hereof.

Fig. 10 is a vertical sectional view of the vehicle axle and means connecting the shock-absorber thereto.

Fig. 11 is a sectional view of means alternative to that of Fig. 10 for connecting the shock-absorber and vehicle axle.

Figure 1:
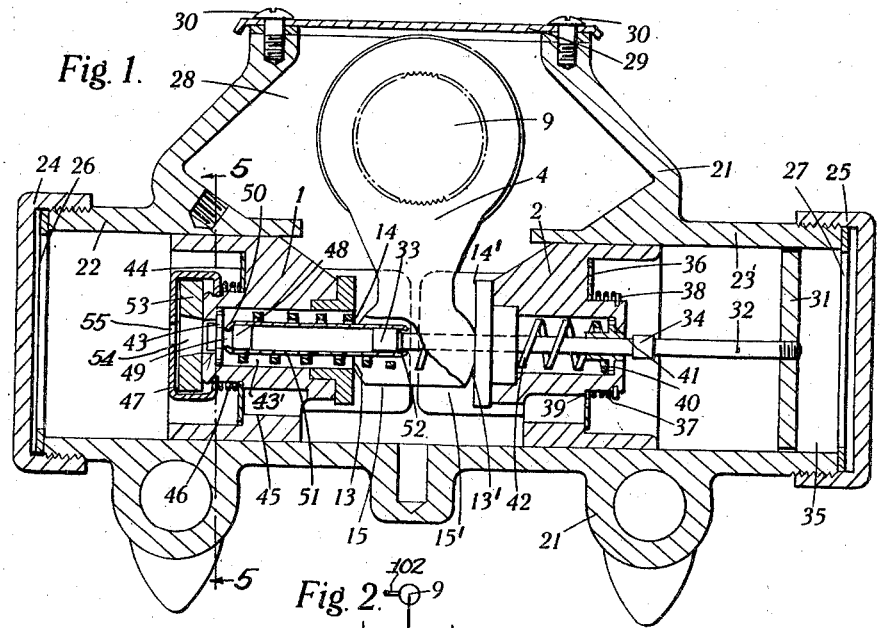
Fig. 1 is a vertical sectional view of a preferred construction of shock-absorber or stabilizer unit embodying my invention, the section being taken through the longitudinal center of the cylinders.
Figure 2:
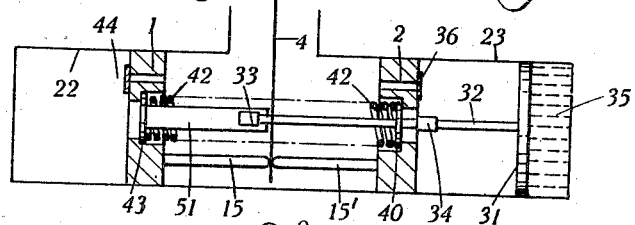
Fig. 2 is a diagrammatic view showing the crank arm and piston in the same positions as in Fig. 1.

Referring now to Figs. 1 and 2 of the drawings, 4 is a crank connected to a control arm on one end of a rock shaft 9, which control arm is itself connected to the axle (not shown) to be stabilized; crank arm 4 is adapted to swing to and fro within a hydraulic oil-tight casing 21 attached to the vehicle chassis (not shown), and in correspondence with relative movement of the spring-connected axle and chassis, said casing 21 being compartmented so that its lower portion comprises two cylinders 22—23 within which pistons, 1, 2, are adapted to be moved by said to and fro movement of crank arm 4. Crank arm 4 is formed at its lower end with hardened faces 13, 13', in continuous bearing contact with similarly hardened abutment members 14, 14', fixed respectively to pistons 1, 2. Pistons 1, 2, are formed respectively with shoulders 15, 15', which extend alongside crank arm 4 and are drawn towards each other by means of a coupling pin 16 and spring 17 as seen in Fig. 8. The adjacent ends of shoulders 15, 15', are formed with slots 18, 18', with narrowed neck portions 19, 19', of such dimensions that heads 20, 20', formed on pin 16 can fit with clearance in slots 18, 18', the shank of the pin then occupying the neck portions 19, 19'; prior to the insertion of pin 16 into the slots 18, 18', a strong short coil spring 17 is slipped thereonto (head 20 being made smaller than the inner diameter of the spring to enable the latter to be slipped thereover), so that when the pin and spring are in place as shown in Fig. 8, pistons 1, 2, are tightly drawn towards each other and against faces 13, 13', of crank arm 4. In this way any tendency towards looseness or rattle between these parts is overcome.

The oil-tight casing 21 is, as above stated, compartmented so that its lower portion comprises two cylinders 22, 23, within which pistons 1, 2, can slide. Cylinders 22, 23 are closed at their outer ends by screwed-on caps 24, 25, and sealing washers 26, 27. The upper part of casing 21, comprising a chamber 28 containing parts 4, 9 is formed with a closure lid 29 firmly secured as by screws 30. The cylinders and a part of the chamber above it are filled with oil. Within cylinder 23 there is mounted an anchor-plate 31 which constitutes a piston having a loose fit in the cylinder, and to said plate is screwed an anchor rod 32 formed with stops thereon constituted by portions 33, 34 of enlarged diameter. The cylinder, including the space 35 between anchor-plate 31 and adjacent end cap 25 of cylinder 23 being filled with oil, the effect is that plate 31 at all times provides a dashpot effect, since it can only move to the right or the left of the position shown in Fig. 1 when oil has been forced through the circumferential gap between plate 31 and the wall of cylinder 23; this gap is such that the plate 31 can move only slowly, when acted upon by anchor rod 32 as hereinafter explained.

Piston 2 is formed with two valve means therein:—Firstly, a one-way disk valve 36 loaded by a light spring 37 held in place on its seat 39 by a spring ring 38, and permitting flow of fluid through piston 2 only from left to right as viewed in Fig. 1; secondly, a mushroom valve 40 held on its seat 41 by a spring 42 (which bears at its opposite end against a similar valve 43 seating on piston 1), valves 40 and 43 being freely slidable for a limited distance along anchor rod 32, and being lifted off their seats only by being engaged, as hereinafter described, by portions 33, 34 of anchor rod 32. Valve 40 only permits flow of fluid through passage 40' in piston 2 from right to left as viewed in Fig. 1. Piston 1 is similarly formed with two valve means; firstly a one-way disk valve 44 held on its seat 15 by a spring 46 held in place by a cornering-valve casing 47 (hereinafter described), valve 44 being similar to, but acting in an opposite direction to, valve 36 mentioned above; secondly, a one-way mushroom valve 43, above-mentioned, controlling flow of fluid through passage 43' in piston 1, which valve is formed with stem 48 having a part 49 of reduced diameter which is engaged by the turned-over lip or flange 50 of a cylindrical sleeve 51, the valve and sleeve being thus connected so that they will move together. A part 33 on the anchor rod 32 is slidable within the sleeve 51 and a turned-over lip or flange 52 on the sleeve ensures that the latter is always connected, with lost-motion, to anchor rod 32.

Within casing 47 is loosely guided a rolling cornering valve 53, (see Figs. 5, 6 and 7). This valve consists of a disk having a central hole 54 which, in the normal rest position of the valve, registers with a hole 55 formed in the casing 47. Valve 53 is carried in a runway 56 within which it can freely roll, the runway being tilted at an angle (of the order of 6°) to the horizontal, thus ensuring that normally valve 53 shall occupy the position shown in Fig. 5 resting against stop 57. If, however, the vehicle on which the stabilizer is mounted "corners", travels around a corner or curve at a certain rate of speed and in the appropriate direction, valve 53 is constrained by centrifugal action to roll up runway 56, and in so doing to block hole 55 as shown in Fig. 6. In these circumstances fluid which under normal conditions (of straight travel of the vehicle) would force valve 43 open and pass therethrough is prevented from reaching valve 43 by the blocking effect of valve 53. In practice, the arrangement of the stabilizer unit and cornering valve is such that if the stabilized vehicle makes a fast turn, say to the left, the right front spring, which would then normally become compressed by the sway of the vehicle, is cramped or prevented from being so compressed, and is artificially stiffened to prevent undue vehicle sway. Such artificial stiffening of the vehicle spring, however, requires to be partially compensated for, in order to prevent undue shock being transmitted directly from the vehicle axle, through the "locked" shock-absorber, to the vehicle frame. This necessary compensation is provided by the provision of a resilient linkage between the vehicle axle and the crank arm 4. This resilient linkage may take either of two forms shown in Figs. 10 and 11 and hereinafter described.

Figure 3:
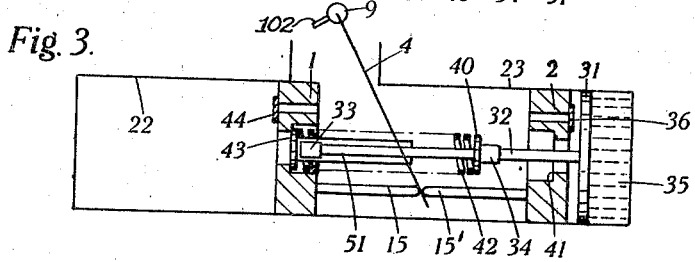
Figs. 3 and 4 are diagrammatic views similar to Fig. 2 showing the crank arm and piston in different positions, illustrating the manner of operation of the apparatus shown in Fig. 1.
Figure 4:
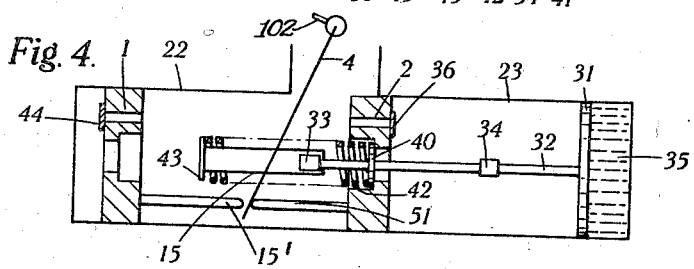

Attention is now directed to Figs. 1 to 4; Figs. 2, 3 and 4 are diagrammatic representations of Fig. 1, valves 36, 44, cornering valve casing 47, and other details being omitted, and crank arm 4, and shoulders 15, 15', being conventionally shown. Fig. 2 represents the stabilizer under conditions of normal ride level of the vehicle in which it is mounted, that is, the condition that obtains when the vehicle is stationary and not subjected to changing stresses imposing changing strains upon the vehicle springs. Valves 40, 43 are maintained closed by spring 42, which is rated so as to automatically determine the conditions of spring compression or movement under which the stabilizer unit shall come into action. If the vehicle is loaded so that the spring, connected to the stabilizer unit shown, causes arm 4 to assume a position at the left of that shown in Fig. 1, when the vehicle is stopped, the anchor plate 31 will be slowly moved, by the expansion of the spring 42, to a new position in cylinder 23 which will then be "normal ride level" position of the stabilizer unit so long as such loading of the vehicle remains constant. Anchor plate 21 does not, however, move in correspondence with sudden movements (such as those due to travel of the vehicle over uneven terrain) imparted to arm 4.

It may be here explained that in order to appreciate, analyze and properly stabilize the various movements occurring between the vehicle axle and the chassis, said movements can be divided logically into the following four groups:

*Movement 1.*—Movement of the axle upward from "ride level" position, so as to compress the spring: this movement occurs when the vehicle wheel meets, and is forced upwardly by, an upward projection on the surface being traveled over.

*Movement 2.*—Movement of the axle downward from the elevated position, reached as a result of Movement 1, to "ride level" position: this movement occurs when the wheel descends after having passed over an upward projection on the road surface.

*Movement 3.*—Movement of the axle downward from "ride level" position: this movement occurs when the wheel drops into a depression in the road surface.

*Movement 4.*—Movement of the axle from the position reached as the result of Movement 3, to "ride level" position: this movement occurs when the wheel rises from the depression into which it has dropped.

The diagrams which comprise Figs. 3 and 4 will now be described, and it should be borne in mind that the rocking movements of drop crank 4 as so described correspond to the above movements in the following relation:—(a) movement of crank arm to the left as viewed in Fig. 4 corresponds to Movement No. 1; (b) movement of 4 to the right in this figure corresponds to Movement No. 2; (c) movement of crank arm 4 to the right as viewed in Fig. 3 corresponds to Movement No. 3; (d) movement of 4 to the left in Fig. 3 corresponds to Movement No. 4. It is to be observed that Movements Nos. 1 and 3 are permitted to occur without the application of a damping resistance, such resistance being, however, applied with progressively decreasing force in Movements Nos. 2 and 4.

If, as the result of a road shock imparted to the vehicle axle, arm 4 is moved into the position shown in Fig. 3, pistons 1 and 2 will be moved to the right. Anchor plate 31, however, remains stationary and with it anchor rod 32. Portion 34 on rod 32 therefore raises valve 40 off its seat 41 as piston 2 moves to the right, and oil contained within cylinder 23 is forced past valve 40 and through one-way valve 44 in piston 1, into cylinder 22, valve 44 opening under the oil pressure and then closing. If now arm 4 is forcibly moved from the position shown in Fig. 3 to that shown in Fig. 2, valves 43 and 36 are forced open, setting up a precalculated damping effect, and oil passes from cylinder 22 to cylinder 23. If now, further movement of arm 4 carries it from the Fig. 2 position to that of Fig. 4, anchor arm 32, acting through lost motion slide 51 raises valve 43 from its seat in piston 1, and permits oil to flow from cylinder 22 to cylinder 23 past valve 36. Finally during the return from the Fig. 4 position to that of Fig. 2 valves 40 and 44 are forced open, setting up a pre-determined resistance and permit the oil to become distributed substantially equally between cylinders 22, 23.

Attention is now directed to Fig. 9 of the drawings, which illustrates an alternative form of stabilizer unit to that shown in Fig. 1. Where parts are present in Fig. 9 similar in function or arrangement to parts shown in Fig. 1, they are designated by the same reference numerals with the addition of a dash, e. g. members 9', 4', 28', 25', 27', 31', 32'. The lower end of arm 4' in Fig. 9 lies between shoulders 60, 60' formed integrally with a hollow cylindrical sleeve or stem 61' fast at its right hand end to a single piston 61 slidable within a single cylinder 62 which is screwed into the main body of the unit casing 63. Cylinder 62 secures in place between it and casing 63 a shouldered partition member 64 through which stem 61 is fitted to slide, said partition member being provided with one-way disk-valves 65, which permit free flow of oil from left to right as viewed in Fig. 9. Piston 61 is provided with two valves 74. A disk 66, at the right hand end of the piston, normally maintains valves 74 in closed position by the action of tensioned spring 67 which is attached at its right hand end to a plate 68 in contact with valve disk 66, and at its left hand end to a plate 69 attached to the stem 70 of a mushroom valve 71 which is normally held by the tension of the spring against a valve seating 72 fast to piston sleeve 61'. Anchor rod 32' is formed with an enlarged portion 34' which serves to shift plate 68 out of contact with valve 66 when the piston 61 is quickly moved to the left by crank arm 4'. The left-hand end 33' of anchor rod 32' is, in the normal ride level position of the apparatus, slightly separated from the end of stem 70, but when the piston 61 is moved to the right, as viewed in Fig. 9, end 33' abuts against stem 70, and holds it against rightward movement, whereby valve 71 is held clear of its seating 72 which moves with piston 61. Anchor plate 31' performs the same function in the Fig. 9 construction as it does in that of Fig. 1, the space between plate 31' and cap 25' being oil-filled.

Disk valve 66 is prevented from becoming displaced from the piston and is limited in its outward movement by a ring 73 sprung into a groove in piston 61.

The three valves 74, 65 and 71 provide between them the same control of oil-flow within the unit of Fig. 9 as do valves 40, 43, 36 and 44 in Fig. 1.

A cornering valve and resilient linkage may be provided in the construction of Fig. 9 substantially similar to those described above with reference to Figs. 1 and 7.

All the four movements referred to above occur very quickly, and it will be realized that under running conditions drift piston 31 does not move unless the weight carried by the vehicle (and hence the "ride level" thereof, and the distance between the spring-connected members, e. g. the axle and chassis) is altered. As a result of the fact that piston 31 provides a constant datum with respect to which the hydraulic shock-absorbing actions take place, such actions are always initiated from "ride level" position, whatever it may be.

As hereinbefore stated, means are provided for partially compensating for the artificial stiffening of the vehicle spring by the action of the shock-absorber, in order to prevent undue shock being transmitted directly from the vehicle axle through the "locked" shock-absorber to the vehicle frame. This resilient linkage may take either of two forms, shown respectively in Figs. 10 and 11. In the first construction there is arranged between the vehicle axle 101 and the control arm 102 that is mounted on shaft 9, a pre-loaded coil spring 103 having a higher "rate" than the vehicle spring. Spring 103 is carried on a bolt member 104 a head 105 of which engages axle member 101, and a nut 106 of which grips arm 102 between rubber buffers 107, 108. A shoulder 109 on bolt member 104 is formed between the upper end of spring 103 and buffer 108. In this case, therefore, if the shock-absorber becomes "locked" (as it will do, during cornering of the vehicle in a predetermined direction), road-shocks which would otherwise be transmitted by the vehicle axle through the "locked" shock-absorber to the vehicle frame, are absorbed by coil spring 103, which is however of such a "rate" that the vehicle spring is artificially stiffened, but in a resilient manner, during such cornering. In the second construction shown in Fig. 11, shaft 9 is formed or provided with an extended portion of such material and dimensions that it forms a torsionally resilient rod 110 of which one end 111 is keyed to a torsionally resilient tube 112 concentric therewith, tube 112 being keyed at 113 to the external control arm 115, so that movements of the vehicle axle are transmitted to crank arm 4 solely through the resilient rod 110 and tube 112. As shown, the rod 110 lies within tube 112, the latter being journaled at one end 114 in a fixed portion of the shock-absorber 21, or of the vehicle frame. It will be understood that in this construction the torsionally resilient members 110, 112 are arranged in series with the shock-absorber, as is the coil spring 103 of Fig. 10, the resilient linkage thus provided between the vehicle axle and the shock-absorber being such that the action of the latter is in no way interfered with, but that when the shock-absorber is "locked" the resilient linkage takes up excessive shocks imposed on the axle.

What I claim is:

1. In a shock-absorber for controlling the relative movements of two spring-connected members, a fluid containing cylinder, a piston shiftable in the cylinder, said piston having a liquid flow passage extending from side to side thereof and communicating with opposite ends of the cylinder, normally closed valves controlling the passage at each end of the piston, an auxiliary piston mounted in the cylinder between one end of the cylinder and the first-named piston and constructed to permit restricted flow of fluid from side to side thereof, and means connecting said auxiliary piston with the first-named piston for movements therewith under prescribed movements of the latter, said means being operatively coupled to the valves for effecting opening movements thereof in opposite movements of the first-named piston.

2. In a shock-absorber for use between two relatively movable spring-connected members, a fluid containing cylinder, a piston shiftable in said cylinder and provided with a passage for flow of liquid therethrough from side to side of the cylinder, valves at the ends of said passage, an auxiliary piston arranged between the first-named piston and one end of the cylinder and constructed for the slow passage of fluid from side to side thereof, and means connecting the first-named piston with the auxiliary piston for effecting movements of the auxiliary piston under prescribed movements of the first-named piston, said means embodying a portion engageable with and controlling the action of one of said valves and said means having a lost motion operating connection with the other valve.

3. In a shock-absorber for controlling the relative movements of two spring-connected members, a fluid containing cylinder, a piston shiftable therein and having a passage for flow of fluid from side to side thereof, spring-controlled valves at the ends of said passage and controlling the flow of fluid therethrough, an auxiliary piston arranged between one end of the cylinder and the first-named piston and constructed for slow movement of fluid from side to side thereof, and a rod connected to the auxiliary piston and having an abutment for engagement with one end of the first-named piston and the valve at the adjacent end of the flow passage and having a lost motion connection with the valve at the opposite ends of the flow passage.

4. In a shock-absorber for controlling the relative movements of two spring-connected members, a fluid containing cylinder, a piston comprising two spaced piston members coupled for shifting movements in unison in said cylinder, said piston members having ports controlling the flow of fluid therethrough and between the same and the opposite ends of the cylinder, spring-controlled valves governing the flow of fluid through said ports, an auxiliary piston disposed in the cylinder between one end of the cylinder and one of said piston members and constructed for the slow passage of fluid from side to side thereof, and connecting means between said piston members and the auxiliary piston and said auxiliary piston and the valves, said connecting means including a rod and a sleeve having a lost motion connection therewith, said rod having an abutment for coaction with one of said valves and said sleeve being operatively coupled to the other of said valves.

5. In a shock-absorber for controlling the relative movements of two spring-connected members, a fluid containing cylinder, a piston shiftable therein and having a passage for the flow of fluid from side to side thereof and also having a port independent of said passage for flow of fluid from side to side thereof, a spring-controlled relief valve governing said port and adapted to open in one direction of the piston, a spring controlled valve governing the flow of fluid through the passage, an auxiliary piston in the cylinder between one end of the cylinder and the first-named piston, said auxiliary piston being constructed for slow movement of fluid from side to side thereof, and a member connected with the auxiliary piston and slidably engaging the first-named piston, said member having an abutment for controlling the action of the second-named valve and engageable by the first-named piston in certain movements thereof for transmitting motion to the auxiliary piston.

6. In a shock-absorber for controlling the relative movements of two spring-connected members, a fluid containing cylinder, a piston comprising a pair of piston members disposed in the cylinder for shifting movements therein and operatively coupled for movement in unison, said piston members having ports and passages for flow of fluid between the ends of the cylinder and the space between the piston members, valves controlling said ports, valves controlling the passages, an auxiliary piston member in the cylinder between one of said piston members and an end of the cylinder, said auxiliary piston member being constructed for slow passage of fluid from side to side thereof, spring means for normally holding the valve seated, a sleeve connected to the valve controlling the passage in one of the piston members, and a rod extending from the auxiliary piston through the other piston member and having an abutment for cooperation with said piston member and the valve controlling the fluid passage therein and having a lost motion connection with said sleeve.

7. In a hydraulic shock absorber for controlling the relative movements of the spring-connected body and axle of a vehicle, a fluid containing cylinder, a piston therein and means for moving said piston in response to relative movements of the axle and body, said piston having a passageway therethrough and valves controlling the flow of fluid through the passageway to permit free movement of the piston away from its normal position in either direction and to retard its return to normal position, and a cornering valve mounted on the piston and adapted to move by centrifugal force into position to obstruct the flow of fluid through said passageway when the vehicle is travelling in a curved path.

8. In a hydraulic shock absorber for controlling the relative movements of the spring-connected body and axle of a vehicle, a fluid containing cylinder, a piston therein and means for moving said piston in response to relative movements of the axle and body, said piston having a passageway therethrough and valves controlling the flow of fluid through the passageway to permit free movement of the piston away from its normal position in either direction and to retard its return to normal position, a guideway mounted on the piston and extending transversely thereof, a cornering valve movable in said guideway and having a port normally in line with an outlet of said passageway, said cornering valve adapted to move by centrifugal force into position to obstruct the flow of fluid through said passageway when the vehicle is travelling in a curved path.

9. In a hydraulic shock absorber for controlling the relative movements of the spring-connected body and axle of a vehicle, a fluid containing cylinder, a piston therein and means for moving said piston in response to relative movements of the axle and body, said piston having a passageway therethrough and valves controlling the flow of fluid through the passageway to permit free movement of the piston away from its normal position in either direction and to retard its return to normal position, a guideway mounted on the piston and extending transversely thereof, a circular cornering valve in said guideway and having a central port normally in line with an outlet of said passageway, said cornering valve adapted to roll along said guideway by centrifugal force into position to obstruct the flow of fluid through said passageway when the vehicle is travelling in a curved course.

WILLIAM ROBERT OYSTON.